United States Patent Office 3,110,285
Patented Nov. 12, 1963

3,110,285
FISH PRESERVATION
Edward E. Greenough, 1811 S. Norton Ave.,
Sioux Falls, S. Dak.
No Drawing. Filed Aug. 19, 1959, Ser. No. 834,662
13 Claims. (Cl. 119—3)

This invention relates to fish preservation, and more particularly to a concentrate for addition to an aqueous medium to preserve fish life therein, a method of treating an aqueous medium for the preservation of fish life therein, and the composition of an aqueous medium adapted to preserve fish life therein.

Although the instant invention is useful in the preservation of any type of fish life including minnows, goldfish, and the like, it is particularly useful in the preservation of valuable tropical fish and will be described primarily in connection therewith. Fishermen know well that after a relatively short period of time minnows in a bucket will begin dying and some believe that this is because of a shortage of oxygen dissolved in the water in the bucket. Actually, I have found that there is much more to the story than this. There are a number of factors which will be discussed hereinafter in detail. In the case of valuable tropical fish, these fish must be shipped from time to time to various distributors, and again from the distributors to the individual purchasers. It has been found that substantial losses are incurred during the shipping of the fish from one location to another. Of course, it is not practical to ship the fish in tanks of tremendous size so that there is available a substantial amount of fresh water for each fish. Instead, the fish are shipped in rather close quarters and in a limited amount of water.

I have discovered a number of factors which are involved in the loss of fish in transit and my invention relates to means and methods of bringing these factors under control so as to minimize the loss of fish in transit. First of all, the fish use the oxygen normally dissolved in the water and give off carbon dioxide and I have found that at and beyond a certain concentration of carbon dioxide the carbon dioxide itself will kill the fish even if there is a sufficiency of oxygen. In addition, fish in transit create a bacterial culture as the result of the discharge from slime, vomit and other excreta; and this process appears to be accelerated in the case of fish in transit. Such bacteria are harmful to the fish and the fish food in the aqueous medium and also tend to withdraw oxygen from the aqueous medium. In addition, during transportation, the fish apparently become greatly excited, which results in bruising of the fish and often a tendency toward cannibalism. This excitement also increases the oxygen consumption of the fish.

My invention provides a method of treating the aqueous medium containing the fish in such a manner as to overcome all of these various difficulties, and my invention further provides a suitably treated aqueous medium to overcome these difficulties and a concentrate for treating an aqueous medium for this purpose. My treatment of the aqueous medium involves the addition of several different ingredients in relatively minute quantities or concentrations which not only results in the overall end result of minimizing the loss of fish but also brings about a better condition in the fish itself and in the surrounding aqueous medium by virtue of synergistic action of these ingredients.

One aspect of my invention involves an aqueous medium adapted to preserve fish life therein, comprising (a) an alkaline buffer capable of absorbing $CO_2$ and stabilizing the pH, (b) a bacteriostatic agent for bacteria discharged by the fish, (c) a hypnotic for the fish, and (d) and acid for substantially neutralizing the aqueous medium, said ingredients (a), (b), (c) and (d) being non-toxic to the fish and being present in minute concentrations sufficient to carry out their functions, and the remainder being substantially water. Other aspects of my invention involve a concentrate for treating the aqueous medium to obtain the foregoing composition therein; and still another aspect of the invention involves a method of treating the aqueous medium so as to obtain the composition just described.

It is, therefore, an important object of my invention to provide a method and composition for fish preservation, particularly for the preservation of fish in transit.

It is a further object of my invention to provide a composition of compatible ingredients that is capable of bacteriostatic action against bacteria discharged by the fish, that is capable of absorbing carbon dioxide ($CO_2$) and simultaneously stabilizing the pH of the aqueous medium, and that is capable of quieting the fish by hypnotic action so as to reduce the oxygen consumption of the fish, the carbon dioxide discharge of the fish, the bacterial discharge of the fish, chances of bruising, and a tendency toward cannibalism (all of which undesirable features contribute materially to the loss of fish in transit).

Other objects, features and advantages of my invention will become apparent to those skilled in the art from the following detailed disclosure thereof.

My invention consists in a method of preserving fish life in an aqueous medium, which comprises adding to the aqueous medium (a) an alkaline buffer capable of absorbing $CO_2$ and stabilizing the pH, (b) a bacteriostatic agent for bacteria discharged by the fish, (c) a hypnotic for the fish, and (d) an acid for substantially neutralizing the aqueous medium, said ingredients (a), (b), (c) and (d) being non-toxic to the fish and being present in minute concentrations sufficient to carry out their functions; and further my invention consists in a concentrate for carrying out the foregoing method and the resulting aqueous medium obtained by carrying out the foregoing method.

As a specific example of the practice of my invention, I have started with 2.3 gallons of water, as a basis for a concentrate later to be added to an aqueous medium for fish. To the water I have added 4 pounds of trishydroxymethylaminomethane, which is a commercial fertilizer produced by Commercial Solvents. I have also added 3.6 grams of Acriflavine Neutral (manufactured by Abbott). I have also added 10 grams of sodium chloride (which is free from iodine which is toxic to fish). I also dissolved 1 ounce of quinaldine (manufactured by Distillation Products Industries, a division of Eastman Organic Chemical Department) in 3 ounces of acetone and then added this solution to the water. Next I added approximately 1 quart of concentrated hydrochloric acid to the water to adjust the pH to approximately neutral (i.e. pH 7.0). This results in a concentrate of suitable strength so that only a small amount need be added to the aqueous medium for the fish. To 1 gallon of water containing minnows, I have added ⅓ of an ounce of the foregoing concentrate and I found that in a matter of seconds the excited action of the minnows diminished and they were quieted, and the minnow life was extended greatly beyond that of a corresponding gallon of water containing minnows in the same quantity, which was not treated with my concentrate.

I added ½ ounce of the concentrate to a gallon of water containing goldfish and found that corresponding results were obtained. Also I have added ½ ounce of the foregoing concentrate to a gallon of water containing tropical fish and found that the same results were obtained. These treated gallons of water containing the various fish can be transported from one place to another and it is observed that the loss of fish in transit is greatly minimized and in many cases completely avoided. It is further noted that as soon as the fish in these treated gallons of water are placed in fresh water they effect a a complete recovery in from 3 to 5 minutes and return to normal activity; and this is a particular advantage obtained in the use of the specific hypnotic quinaldine, which acts very swiftly and which is deactivated very swiftly when the fish are placed in fresh water.

One of the essential ingredients used in the practice of my invention is the ingredient (a) which is an alkaline buffer capable of absorbing CO₂ and stabilizing the pH. I have found it particularly important to use a buffer for stabilizing the pH, which may tend to change because of the production of $CO_2$ by the fish. The instant buffer not only stabilizes the pH but also actually absorbs the $CO_2$ given off by the fish, thus reducing the actual concentration of $CO_2$ (as a dissolved gas) in the water. It is particularly important, in the light of my studies, to maintain a minimum concentration of dissolved $CO_2$ in the aqueous medium containing the fish. Also, the alkaline buffer which is used must be compatible with the other ingredients which will be described in detail hereinafter. I have found that trishydroxymethylaminomethane is particularly and uniquely satisfactory for this use. Trishydroxymethylaminomethane has the following structural formula:

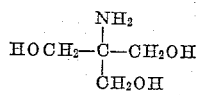

This compound is very soluble in water; 80 grams of it will dissolve in 100 milliliters of water at 20° C.; so I am free to use a substantial quantity of this material in the concentrate. On the basis of each 2.3 gallons of water in the concentrate, I may use from 1 to about 10 pounds of trishydroxymethylaminomethane, 10 pounds being more or less the practical upper limit. Preferably 4 pounds is used and the concentration used is such that the addition of the concentrate to the aqueous medium for the fish will result in a concentration of trishydroxymethylaminomethane within the range of about 2½ to about 7½ grams per gallon. Ordinarily, the amount of concentrate added to the aqueous medium may vary within wide limits, but from a practical point of view the amount added is preferably within the range of about 0.1 to 2 ounces per gallon of the aqueous medium.

Another essential ingredient for use in the practice of my invention is a bacteriostatic agent for bacteria discharged by the fish. As previously mentioned, the bacteria discharged by the fish are harmful with respect to the fish themselves, any food placed in the aqueous medium for the fish, and possibly any vegetation in the aqueous medium. Also, the bacteria use up oxygen in carrying out their normal functions. It is important to stop the bacteria from carrying out their functions and this is accomplished by the bacteriostatic agent, which is at least effective to stop the functions and growth of the bacteria (i.e. at least bacteriostatic) and is preferably effective to kill the bacteria (i.e. bactericidal). As used herein, the term bacteriostatic is considered generic to materials which merely stop the growth and function of the bacteria and those which definitely stop such growth and function by killing the bacteria. The agents which may be used for this purpose include several dyes such as iridium, methylene blue and acridine dyes. Also antibiotics such as the sulfa compounds, penicillin, chloramycetin and the like may be used. In any event, these materials are used in the concentrate in such quantities that the introduction of the concentrate into the aqueous medium will result in a minute concentration sufficient to carry out the bacteriostatic function. Such concentration may range from ½ to as much as 10 or 20 parts per million (p.p.m.). I have found, however, that acriflavine is particularly suitable for use in the practice of the invention and it is particularly compatible with the other preferred ingredients used in the practice of the invention. Its function is not impaired in any way by the other ingredients used in the practice of the instant invention and it cooperates particularly well with ingredient (a) to maintain the proper oxygen-carbon dioxide ratio in the aqueous medium and it further cooperates with the hypnotic (c) to permit its function in minimizing consumption of oxygen by the fish, so as to further control the oxygen-carbon dioxide ratio in the aqueous medium. Acriflavine is available in its neutral form or as salts thereof, such as acriflavine chloride. I prefer, however, to use Acriflavine Neutral. On the basis of each 2.3 gallons of water in the concentrate I may use from 1 to 10 grams of acriflavine as a generally practical range. To some extent the amount of acriflavine used should be correlated with the amount of the alkaline buffer (a), so that the desired amount of alkaline buffer can be obtained in the aqueous medium ultimately and the desired amount of acriflavine may also be obtained. The desired amount of acriflavine in the aqueous medium is within the range of about 1 to about 5 p.p.m. In any event, the amount of bactericidal or bacteriostatic agent used is a minute amount that is sufficient to carry out the function desired. The amount used in the concentrate is an amount sufficient to dilute down in the aqueous medium to an effective minute amount, assuming again that the amount of concentrate added should be within the practical range of about 0.1 to 2 ounces per gallon of aqueous medium (and this assumption is made throughout in connection with the approximate concentrations of ingredients in the concentrate itself).

Another ingredient that is essential to the practice of my invention is ingredient (c) which is a hypnotic for the fish. Although very few products, such as the barbiturates and each of the tranquilizers now available may accomplish the same effect as the quinaldine which I prefer to use, the quinaldine has been found to be unusually effective on fish. Its hypnotic effect occurs in a matter of seconds after addition of the concentrate to the aqueous medium containing fish; and it is found that the fish make a complete recovery therefrom in from 3 to 5 minutes after being placed in fresh water. The hypnotic effect is to place the fish in suspended animation so that they require very little oxygen and are easily and safely shipped. The hypnotic cooperates with the antibacterial agent to minimize consumption of oxygen in the water and likewise these two ingredients cooperate with the alkaline buffer to minimize the occurrence of carbon dioxide in the water. Again, the amount of hypnotic used is an amount sufficient to obtain in the aqueous medium a minute concentration that is still sufficient to carry out the function. In the concentrate the amount of quinaldine used (again on the basis of each 2.3 gallons of water) should be within the range of 0.2 to about 10 fluid ounces. Of course, the amount used in the concentrate should be correlated generally with the amounts of buffer (a) and antibacterial agent (b). In other words, the approximate ratio of 4 pounds of buffer (a) to 3.6 grams of antibacterial agent (b) to 1 ounce of hypnotic (c) should be maintained in the concentrate, so that the resulting minute concentrations in the aqueous medium for the fish will be substantially within the limits indicated herein. In the case of the quinaldine I prefer to use a final concentration in the aqueous medium for the fish of about 2½ to about 7½ p.p.m.

Another ingredient which may be used optionally in the practice of the instant invention, but which is used to particular advantage in the preferred formulation is acetone. The acetone is used more or less as a coupling agent for assisting in dissolving the quinaldine in the concentrate. For this reason, the acetone is preferably used in a concentration of about 2 to 5 times that of the quinaldine (i.e. 2 to 5 times the fluid ounces of quinaldine added to the concentrate).

It will be appreciated that any of the ingredients described herein for use in the practice of the instant invention will be non-toxic to the fish. The specific preferred ingredients are, of course, non-toxic.

Another ingredient which may be used in the practice of the instant invention is a non-toxic metal chloride, such as sodium chloride. This material should be free from iodine, which is toxic to fish. Otherwise, it may be any non-toxic metal chloride, preferably an alkali metal chloride. This chloride functions as a preservative in mineral balance and definitely assists in the overall functioning of the other ingredients, particularly by virtue of its preservative properties.

Another essential ingredient for use in the practice of the instant invention is the ingredient (d), which is an acid for substantially neutralizing the aqueous medium (and, of course, neutralizing the concentrate itself). The acid must be non-toxic to the fish, and this would be the case of the ordinary mineral acid such as hydrochloric, phosphoric, sulfuric and the like acids and also the organic acids such as acetic or propionic, which are of sufficient strength to effect a neutralization. I prefer to use hydrochloric acid in concentrated form. The amount of hydrochloric acid used is an amount sufficient to substantially neutralize the concentrate. The optimum pH for tropical fish is 6.8 to 7.2, which is substantially neutral. Preferably neutralization is carried out to substantially 7.0. As previously indicated, if the amount of trishydroxymethylaminomethane used in the concentrate is about 4 pounds, then about 1 quart of concentrated hydrochloric acid is required to accomplish substantial neutralization. The alkaline buffer (a) is, of course, the principal ingredient which must be neutralized by the acid (d) in order to obtain substantial neutrality, so the amount of acid (d) used will depend primarily upon the amount of alkaline buffer (a) which is used in the concentrate.

As previously mentioned, the acetone and the non-toxic metal chloride are not absolutely essential to the practice of the instant invention, although they do give an improved result. The amount of acetone used depends primarily upon the amount of quinaldine used, and the amount of non-toxic metal chloride used depends primarily on the preservative action and mineral balance desired, although this amount is still quite minute. In the concentrate, the amount used (on the basis of each 2.3 gallons of water in the concentrate) may range from about 1 to about 30 grams of sodium chloride and it is desired that this amount is sufficient when a small amount of the concentrate is added to the aqueous medium to obtain a final concentration in the aqueous medium of from about 10 to about 30 p.p.m.

The concentrate itself is particularly useful for the practice of this invention, for the reason that the particular materials used therein are not readily available to the ordinary fisherman, or to most distributors of tropical fish or owners thereof. The accurate measurement of the various ingredients is not easily done by the ordinary person unskilled in this type of art. Instead, the provision of the concentrate as a standard supply for owners of tropical fish, fishermen, and others who might have occasion to transport fish makes possible the effective use of the instant invention in a simple manner.

It will further be noted that acriflavine and quinaldine are not accurate chemical names for the materials which they describe, although they are the common names understood in the trade and they are defined in detail in trade literature, as for example, The Merck Index of Chemicals and Drugs (Merck & Company, Inc., 6th edition, 1952).

It will be understood that modifications and variations may be effected without departing from the spirit and scope of the novel concepts of the present invention.

I claim as my invention:

1. An aqueous medium adapted to preserve fish life therein, comprising trishydroxymethylaminomethane in a concentration of 2½ to 7½ grams per gallon, acriflavine in a concentration of 1 to 5 p.p.m., quinaldine in a concentration of 2.5 to 7.5 p.p.m., and hydrochloric acid in a concentration sufficient to substantially neutralize the aqueous medium, and the remainder being substantially water.

2. An aqueous medium adapted to preserve fish life therein, comprising trishydroxymethylaminomethane in a concentration of 2½ to 7½ grams per gallon, acriflavine in a concentration of 1 to 5 p.p.m., quinaldine in a concentration of 2.5 to 7.5 p.p.m., acetone in a concentration 2 to 5 times that of the quinaldine, a non-toxic metal chloride in a concentration of 10 to 30 p.p.m., and hydrochloric acid in a concentration sufficient to substantially neutralize the aqueous medium, and the remainder being substantially water.

3. A concentrate for addition to an aqueous medium to preserve fish life therein, comprising, on the basis of each 2.3 gallons of water in the concentrate, 1 to 10 pounds of trishydroxymethylaminomethane, 1 to 10 grams of acriflavine, 0.2 to 10 fluid ounces of quinaldine, 1 to 30 grams of sodium chloride, and an amount of hydrochloric acid sufficient to substantially neutralize the condensate, said concentrate being adapted to be added to the aqueous medium in concentrations of 0.1 to 2 ounces per gallon of the aqueous medium.

4. A concentrate for addition to an aqueous medium to preserve fish life therein, said concentrate containing the ingredients hereinafter set forth in such concentrations that the addition of 0.1 to 2 ounces thereof to a gallon of the aqueous medium will result in an aqueous medium containing trishydroxymethylaminomethane in a concentration of 2½ to 7½ grams per gallon, acriflavine in a concentration of 1 to 5 p.p.m., quinaldine in a concentration of 2.5 to 7.5 p.p.m., and hydrochloric acid in a concentration sufficient to substantially neutralize the aqueous medium.

5. An aqeous medium adapted to preserve fish life therein, comprising (a) an alkaline buffer that is non-toxic to fish for absorbing $CO_2$ and stabilizing the pH in a concentration of 2½ to 7½ grams per gallon, (b) a bacteriostatic agent for bacteria discharged by the fish, which is a bacteriostatic dye selected from the class consisting of iridium, methylene blue and acridine dyes in a concentration of 1 to 5 p.p.m., (c) quinalidine in a concentration of 2½ to 7½ p.p.m., and (d) an acid that is non-toxic to fish in a concentration sufficient to substantially neutralize the aqueous medium, and the remainder being substantially water.

6. A concentrate for addition to an aqueous medium to preserve fish life therein, said concentrate containing ingredients hereinafter set forth in such concentrations that the addition of 0.1 to 2 ounces thereof to a gallon of the aqueous medium will result in an aqueous medium containing (a) an alkaline buffer that is non-toxic to fish for absorbing $CO_2$ and stabilizing the pH in a concentration of 2½ to 7½ grams per gallon, (b) a bacteriostatic agent for bacteria discharged by the fish, which is a bacteriostatic dye selected from the class consisting of iridium, methylene blue and acridine dyes in a concentration of 1 to 5 p.p.m., (c) quinaldine in a concentration of 2½ to 7½ p.p.m., and (d) an acid that is non-toxic to fish in a concentration sufficient to substantially neutralize the aqueous medium.

7. An aqueous medium adapted to preserve fish life therein, comprising (a) trishydroxymethylaminomethane in a concentration of 2½ to 7½ grams per gallon, (b) a bacteriostatic agent for bacteria discharged by the fish, which is a bacteriostatic dye selected from the class consisting of iridium, methylene blue and acridine dyes in concentration of 1 to 5 p.p.m., (c) quinaldine in a concentration of 2½ to 7½ p.p.m., and (d) an acid that is non-toxic to fish in a concentration sufficient to substantially neutralize the aqueous medium, and the remainder being substantially water.

8. An aqueous medium adapted to preserve fish life therein, comprising (a) an alkaline buffer that is non-toxic to fish for absorbing $CO_2$ and stabilizing the pH in a concentration of 2½ to 7½ grams per gallon, (b) acriflavine in a concentration of 1 to 5 p.p.m., (c) quinaldine in a concentration of 2½ to 7½ p.p.m., and (d) an acid that is non-toxic to fish in a concentration sufficient to substantially neutralize the aqueous medium, and the remainder being substantially water.

9. An aqueous medium adapted to preserve fish life therein, comprising (a) an alkaline buffer that is non-toxic to fish for absorbing $CO_2$ and stabilizing the pH in a concentration of 2½ to 7½ grams per gallon, (b) a bacteriostatic agent for bacteria discharged by the fish, which is a bacteriostatic dye selected from the class consisting of iridium, methylene blue and acridine dyes in a concentration of 1 to 5 p.p.m., (c) quinaldine in a concentration of 2½ to 7½ p.p.m., and (d) an acid that is non-toxic to fish in a concentration sufficient to substantially neutralize the aqueous medium, said acid being selected from the group consisting of hydrochloric, sulfuric, phosphoric, acetic and propionic acids, and the remainder being substantially water.

10. An aqueous medium adapted to preserve fish life therein, comprising (a) trishydroxymethylaminomethane in a concentration of 2½ to 7½ grams per gallon, (b) acriflavine in a concentration of 1 to 5 p.p.m., (c) quinaldine in a concentration of 2½ to 7½ p.p.m., and (d) an acid that is non-toxic to fish in a concentration sufficient to substantially neutralize the aqueous medium, and the remainder being substantially water.

11. An aqueous medium adapted to preserve fish life therein, comprising (a) trishydroxymethylaminomethane in a concentration of 2½ to 7½ grams per gallon, (b) a bacteriostatic agent for bacteria discharged by the fish, which is a bacteriostatic dye selected from the class consisting of iridium, methylene blue and acridine dyes in a concentration of 1 to 5 p.p.m., (c) quinaldine in a concentration of 2½ to 7½ p.p.m., and (d) an acid that is non-toxic to fish in a concentration sufficient to substantially neutralize the aqueous medium, said acid being selected from the group consisting of hydrochloric, phosphoric, acetic and propionic acids, and the remainder being substantially water.

12. An aqueous medium adapted to preserve fish life therein, comprising (a) an alkaline buffer that is non-toxic to fish for absorbing $CO_2$ and stabilizing the pH in a concentration of 2½ to 7½ grams per gallon, (b) acriflavine in a concentration of 1 to 5 p.p.m., (c) quinaldine in a concentration of 2½ to 7½ p.p.m., and (d) an acid that is non-toxic to fish in a concentration sufficient to substantially neutralize the aqueous medium, said acid being selected from the group consisting of hydrochloric, sulfuric, phosphoric, acetic and propionic acids, and the remainder being substantially water.

13. An aqueous medium adapted to preserve fish life therein, comprising (a) trishydroxymethylaminomethane in a concentration of 2½ to 7½ grams per gallon, (b) acriflavine in a concentration of 1 to 5 p.p.m., (c) quinaldine in a concentration of 2½ to 7½ p.p.m., and (d) an acid that is non-toxic to fish in a concentration sufficient to substantially neutralize the aqueous medium, said acid being selected from the group consisting of hydrochloric, sulfuric, phosphoric, acetic and propionic acids, and the remainder being substantially water.

References Cited in the file of this patent

UNITED STATES PATENTS 2,652,807   Washburn _____ Sept. 22, 1953

OTHER REFERENCES

Exotic Aquarium Fishes, Wm. T. Innes, Innes Publishing Co., Philadelphia, Pa., 18th ed., pages 61, 62.

Handbook of Tropical Aquarium Fishes, Herbert R. Axelrod, Dr. Leonard P. Schultz, McGraw-Hill Book Co., New York, N.Y., pages 73, 132, 140, 141, 526.

The Progressive Fish, Culturist, vol. 20, No. 1, January 1958, U.S. Dept. of Interior Fish & Wildlife Service; pages 42, 43 and 44.